United States Patent Office 2,990,736
Patented July 4, 1961

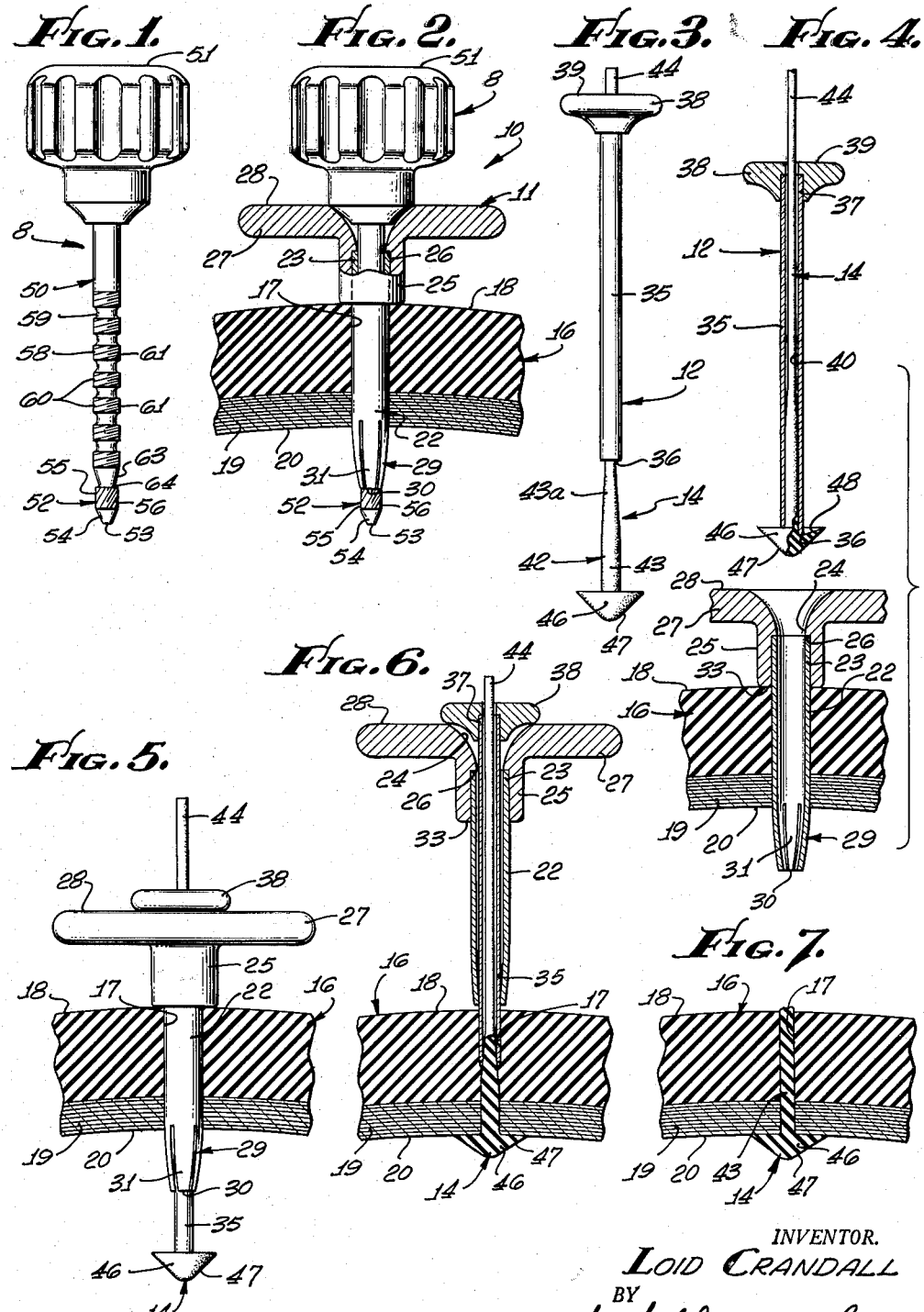

2,990,736
TIRE REPAIR DEVICE
Loid Crandall, Alhambra, Calif., assignor, by direct and mesne assignments, of one-half to Richard G. Butler, Whittier, Calif., and one-half to Specmade Products, Inc., Monrovia, Calif., a corporation of California
Filed Aug. 11, 1958, Ser. No. 754,335
10 Claims. (Cl. 81—15.7)

This invention relates to a novel tire repair device and method for repairing a leak or puncture hole in a hollow resilient member adapted to hold fluid under pressure, and more particularly to a repair device and method for repairing punctures in tubeless vehicle tires having relatively thick resilient walls by utilizing a shaped, solid, longitudinally stretchable, resilient repair plug provided with an enlarged head portion and an elongated tail section.

The present invention is a continuation-in-part of my copending application, Serial No. 608,993, filed September 10, 1956, now Patent No. 2,931,261, in which a tire repair device is disclosed and claimed which utilizes a solid uniformly cylindrical repair plug which is precisely positioned in a puncture hole and then manually held against movement from such position while parts of the repair device are withdrawn from the tire. The present invention contemplates a repair device and method wherein a repair plug of selected shape and configuration is passed into a puncture hole in a convenient facile manner and is then forcibly drawn into tight abutting sealing pressure engagement with internal surfaces of a tire so as positively seal a puncture hole at internal surface margins on the tire encircling the inner end of the hole.

Prior proposed methods of repairing punctures in tubeless tires include several disadvantages such as removal of a tire from its supporting wheel rim, the necessity of special equipment, and no testing of the effectiveness of repair is possible until the tire is again properly mounted upon the wheel rim. Disadvantages of other prior proposed means for repairing tubeless tires where such repair means attempted to place rubber elements into a puncture hole have not been practicel with automobile tubeless tires because of the presence of strong reinforcing fabrics or cords in the tire wall which made insertion of such prior proposed devices difficult and positioning uncertain. Sometimes the force required to press a repair plug into the tire wall was so great that a plug being inserted therein was forced entirely through the wall of the tire. In some instances the fabric cords reinforcing the tire were torn, cut, or damaged by such prior proposed devices.

The present invention, generally speaking, contemplates a hole expanding means comprising a rigid probe member adapted to follow a nail hole and to deposit lubricant on walls of the hole. After the probe member is withdrawn, it may be inserted into a hollow cylindrical guide sleeve member provided with a tapered expandable end, said tapered end merging with the probe tip to permit the probe and guide members to be forced into and through a puncture hole to expand the same. A repair plug carrier is provided in the present invention which comprises a hollow open ended tube of uniform external and internal diameter having an enlarged pressure receiving knob, head, or ferrule. The plug carrier is adapted to receive and hold a resilient plug element which includes a central cylindrical body portion of uniform diameter having integrally formed therewith an outwardly and backwardly flared head portion of outwardly tapering cross section and a tail section of relatively small diameter and of sufficient length so that said tail section may be grasped at one end of the plug carrier to longitudinally stretch and draw the plug member into the plug carrier tube until the headed portion sits against one end of the tube. The plug carrier with the plug element is then inserted into the passageway provided by the hole expanding means (after the probe member is withdrawn), and may be forced through the passageway until the headed end portion is below the inner end of the hole expanding means and is in spaced relation to the interior surface of the tire. When the hole expanding means and the plug carrier are simultaneously outwardly withdrawn as a unit, the plug element is moved outwardly in stretched condition until surfaces of the headed portion are forceably pressed against and seated on the interior surface of the tire. The elongated stretched body of the plug member is stripped out of the plug carrier, fills the puncture hole and the resilient material of the plug element tends to flow into the hole to provide a complete seal.

The primary object of this invention is to disclose and provide a repair device and method for use with fluid pressure hollow members to accomplish repair of puncture holes therein in a simple, effective, positive, foolproof manner.

An object of this invention is to provide a method of repairing punctures in a tire wall whereby a headed plug element may be externally manipulated in such a way that its headed end is forceably pressed against internal surface margins of the tire wall surrounding the puncture hole.

Another object of this invention is to provide a repair device which utilizes a simple effective repair plug carrier means.

Another object of this invention is to provide a tire repair device which is adapted to employ a headed resilient repair plug of novel structure in a novel manner.

A further object of this invention is to provide a repair plug element of novel construction which permits external manipulation thereof to internally position and seat the element in a puncture hole in a resilient wall.

Various other objects and advantages of this invention will be readily apparent from the following descriptions of the drawings in which an exemplary of the embodiment in this invention is shown.

In the drawings:

FIG. 1 is an elevational view of a probe member used with the repair device of this invention.

FIG. 2 is a sectional view through a tire tread showing the probe member and hole expander means in the puncture hole.

FIG. 3 is a side elevational view of a plug carrier means and an associated repair plug element before the plug element is drawn into its injection position within the plug carrier means.

FIG. 4 is an exploded sectional view of a tire repair device embodying this invention with the plug carrier means and repair plug element in assembly and ready to be inserted through a hole expanding means already positioned in a puncture hole of a tire wall.

FIG. 5 is a sectional view taken through a tire wall but with the tire repair device in elevation and with the plug carrier and associated plug element inserted in the hole expanding device.

FIG. 6 is a sectional view illustrating withdrawal of the repair device and seating of the headed end of the repair plug tightly against internal surfaces on the tire.

FIG. 7 is a fragmentary sectional view showing a repair plug of this invention in ultimate position in a puncture hole.

A tire repair device of the present invention is generally indicated at 10 (FIG. 2), and includes a probe member 8, a puncture hole expanding means 11, a plug carrier means 12 and a repair plug element 14. FIGS. 2-7 inclusive include a fragmentary sectional view of a hollow resilient member 16 adapted to hold or carry fluid under pressure such as a tubeless tire into which the repair plug element 14 is to be inserted, said tire 16 having a puncture hole 17. The wall of member 16 includes an outer tread portion 18, an inner reinforced fabric portion 19 and an interior surface 20 encircling hole 17. The tire wall at the tread portion is relatively thick.

The probe member 8 may comprise a rigid metal shank 50 carrying at one end a pressure head or knob 51 suitably configured to facilitate pressing a hand thereagainst and grasping thereof for turning in a puncture hole. The shank 50 terminates at its other end in a probe tip 52 having a relatively blunt end face 53 for following a puncture hole and for eliminating any tendency of the probe member to start a new hole which may diverge from the puncture hole. The tip 52 may include a tapered portion 54 which merges with a cylindrical portion 55 having an external surface provided with threads 56 or striations of a relatively steep pitch which facilitate initial entry of the tip into the puncture hole.

Intermediate portion 58 of the shank may be generally cylindrical and may be provided with a plurality of longitudinally spaced, transverse circumferential grooves 59 adapted to provide space for carrying a lubricant and/or cementing adhesive into the hole 17 for wetting or depositing the lubricant on walls of the hole 17. The circumferential lands 60 between the grooves 59 may be provided with external threads 61 of a pitch less than that of threads 56 for facilitating turning of the probe member in the hole 17 and to assist in deposit of the lubricant. The lower end 63 of intermediate portion 58 may be tapered to form an annular recess defined by a curved shoulder 64 of portion 55 of the tip 52 to cooperate with the hole expanding means as later described. It will be noted that the diameter of portion 55 is less than the diameter of the intermediate portion 58.

The puncture hole expanding means 11 may be of virtually the same construction as shown and described in my copending application, Serial No. 608,993 now Patent No. 2,931,261. Hole expanding means 11 may comprise a hollow guide sleeve 22 providing an enlarged passageway 24 to the interior of the member. The passageway 24 may be defined by an upper cylindrical portion 23 fitted in a ferrule, knob, or head 25 made of suitably molded plastic material or the like. The portion 23 may seat at its upper end against an internal annular shoulder 26 which may be formed in the passageway 24. The ferrule 25 may be secured to portion 23 by ensleeving the ferrule over portion 23 when the material of the ferrule is hot so that as the material cools and contracts, the portion 23 will be tightly, frictionally gripped thereby. The ferrule 25 may include a radially, outwardly extending top flange 27 of any selected shape and configuration so as to provide a suitable top pressure face 28 so that the hole expanding means 11 may be readily pressed by a hand into a puncture hole and later grasped by fingers for withdrawal thereof.

The sleeve 22 may include a longitudinally split, tapered lower portion 29 having a plurality of tapered segments 31, each lying in a quadrant of 90°. Tapered portion 29 normally converges to a circular end at 30 for seating in the recess behind the probe tip and to present an external tapered surface smoothly merging with the cylindrical portion 55 of the tip. To provide sufficient rigidity of tapered segments 31, the sleeve 22 may be made of a selected spring metal and of sufficient thickness in section so that tapered portion 29 will closely seat around tapered portion 63 of the shank. The length of sleeve 22 is sufficient to extend below internal surface 20 of the tire wall when such wall is of the thickness of an eight or ten ply tire. The depth of insertion of the hole expanding means into the tire wall may be limited by contact of external shoulder 33 (FIG. 6) provided at the inner end of the ferrule with the external surface of the tire tread portion 18.

Plug carrier means 12 may comprise a hollow open ended metal tube 35 having a length greater than the overall length of the hole expanding means 11. The tube 35 is of uniform inner and outer diameter throughout its length and has an outer diameter sufficiently less than the inner diameter of passageway 24 to provide an annular space so that the tube with a headed plug element 14 may be readily passed into passageway 24 for injection of repair plug element 14 as later described. One end of tube 35 may be provided with a plain circular edge face 36 lying at right angles to the axis of tube 35 and the other end 37 of the tube may be received and fitted within a knob, head, or ferrule 38 of any selected configuration so that pressure may be conveniently applied by hand to top pressure face 39. Head 38 may be fitted to end portion 37 of tube 35 in a manner similar to that described for ferrule 25. The tube 35 and head 38 provide a continuous through bore 40 open at opposite ends.

Repair plug element 14 may be made of a suitable resilient material such as rubber composition, synthetic rubber compositions or other stretchable, flowable, resilient materials. Element 14 includes an elongated shank 42 comprising a relatively thick cylindrical body portion 43 of uniform diameter greater than the inner diameter of tube 35 and greater than the size of a puncture hole in which the body portion 43 is to be positioned for sealing thereof. Integral with body portion 43 is an elongated relatively narrow tail section 44, said tail section having a length greater than the length of carrier means 12 so that a tail section may extend completely through the bore 40 of the carrier means 12 when the body portion 43 is drawn against end edge face 36 of tube 35. The projecting free end of tail section 44 is adapted to be grasped, stretched and wrapped about fingers of a hand so as to longitudinally elongate and stretch body portion 43 so that it may be drawn into the lower open end of tube 35 as shown in FIG. 4. A taper 43a is provided between body 43 and tail 44 to facilitate drawing of the body portion 43 of the plug element 14 into the tube 35. When the element 14 is positioned in tube 35 as above described as shown in FIG. 4, it will be readily apparent that body portion 43 will be under longitudinal tension and will grip the inner wall of the tube 35 so that element 14 cannot be disassembled therefrom except by application of force.

The plug element 14 also includes a headed end portion 46 integral with body portion 43. Headed portion 46 is shaped so as to provide a generally conical exterior surface 47 pointing or facing in the direction of movement of the plug element and an under-cut, concave back annular face 48. The faces 47 and 48 define a rearwardly directed or flared annular head or skirt of tapering section which facilitates movement of headed end portion 46 through passageway 24. It is important to note that the headed end portion is provided with a section of material which is relatively thick immediately opposite the annular edge face 36 of metal tube 35 so that when the plug carrier means 12 with a plug element 14 therein is forceably pressed and urged through passageway 24, the metal edge face 36 of tube 35 will not sever or cut through the resilient material which joins headed end portion 46 to the cylindrical body portion 43.

The method of sealing a puncture hole such as 17 in a tire wall may be readily generally understood from the above description of the probe member 8, hole expanding means 11, plug carrier means 12, and repair plug element 14. In detail, puncture hole 17 is first opened by withdrawing the nail or other object which caused the tire puncture. The probe member 8 may then be dipped in cement or adhesive used in repair of tires and which will serve to lubricate the puncture hole 17. The probe 8 is inserted into the hole and intermittently turned as it is relatively gently fed under pressure into the hole 17. The threads on the tip and on the intermediate portion 58 facilitate this entry while the grooves 59 carry lubricant into the hole. The probe is then withdrawn by pulling and turning in the reverse direction. The probe member 8 may then be inserted into the hole expanding means 11, which may be lubricated with adhesive on the outer surface thereof, and the probe and expander inserted into hole 17 until shoulder 33 abuts the exterior surface of the tire. The rigid probe tip 52 which extends below the assembly of probe and expander and the recess at 64 which receives ends 29 of the expander, makes this insertion easy and without tearing or cutting of fabric cords. When the probe member 8 is withdrawn from the expander, the expander 11 is positioned in the tire wall and provides a passageway therethrough. The curved surface of shoulder 64 permits spreading of the tapered segments 31 of the tapered portion 29 so that tip 52 may be withdrawn through the expander.

The plug element 14 is then positioned in the plug carrier means 12 by inserting tail section 44 through the plain open end of guide tube 35 until a free-end portion thereof extends beyond the other end of the tube and may be grasped and wrapped or twisted about the fingers of a hand. The plug element 14 is then pulled or drawn into the tube 35 by applying a pulling force to tail section 44. As the tapered and cylindrical portions 43a and 43 are successively drawn against the plain edge face 36 of tube 35, the material of portion 43 is longitudinally stretched so that its diameter is substantially reduced and the elongated body portion 43 is finally positioned in tube 35 with the head portion 46 at the end of tube 35. This stretching and positioning of the plug element 14 in the plug carrier means may also be facilitated by applying to the surface of body portion 43 a suitable adhesive, cement or other lubricating liquids. The headed end portion 46 may also be coated with the adhesive on faces 47 and 48 to facilitate its passage through the passageway 24.

With the plug element 14 positioned in the carrier means 12, the plug element and carrier means may then be forceably urged through passageway 24, the outwardly tapered section of the head portion being folded backwardly against the adjacent end surfaces of tube 35 in the space provided between tube 35 and the wall of the guide sleeve 22 of the expander. The tapered end portion 29 expands to pass the backward-folded headed portion 46. As the latter passes expanded circular end 30 and emerges therefrom, the annular flange on the head portion springs radially outwardly into its normal outwardly and rearwardly flared position. It should be noted that the body portion 43 of the plug element is held and still retained in tube 35 in longitudinally stretched condition.

To properly set or position the plug element 14 in the puncture hole, the hole expanding means 11 and the plug carrier means 12 may be simultaneously withdrawn upwardly and outwardly of the tire wall permitting the tire to contract around the tube 35. In such movement, it will be noted that the tube 35 prevents contraction of hole 17 until body portion 43 is properly longitudinally positioned therein, since body portion 43 is tightly fitted in tube 35, withdrawal of the carrier means and hole expanding means forceably urges the annular back face 48 of the headed portion 46 into pressure engagement and contact with peripheral internal surface margins of internal surface 20 encircling the inner end of the puncture hole 17. Such pressure contact restrains the headed portion 46 of the plug element against further longitudinal outwardly directed movement during withdrawal of the tube 35. Since the head portion 46 has been lubricated with liquid cement or adhesive and such adhesive is carried on back face 48, the headed portion 46 is seated against the internal surface 20 of the tire wall and adhesively bonded thereto under pressure. Further withdrawal of tube 35 from hole 17 causes further stretching and contraction of the tensioned body portion 43 and stripping of the tube from the elongated reduced body portion 43 and longitudinal positioning of body portion 43 in the puncture hole while the body portion is still tensioned.

As tube 35 is finally withdrawn from puncture hole 17, it will be readily apparent that initially body portion 43 has been placed in hole 17 under longitudinal elongation and that when tube 35 is completely withdrawn, the resilient material of body portion 43 tends to reduce such longitudindal elongation and attempts to return body portion 43 to its normal diameter. Thus, body portion 43 exerts laterally outwardly directed forces against the wall surfaces of the puncture hole, and, since the hole expanding means 12 has spread apart the walls of the puncture hole which tends to return to normal position, the plug element 14 is tightly sealingly engaged by walls of the puncture hole to provide an effective fluid tight seal. External tail section 44 may then be cut off adjacent the surface of the tread as shown in FIG. 7.

The above described method of repairing a puncture hole in a tire with a repair device of this invention illustrates its utility when a tubeless tire is retained on a wheel rim and external manipulation of the device provides an internal seal over the inner end of the puncture hole and a seal extending through the tire wall. Sometimes, a puncture hole may be relatively large and the walls of the puncture hole may have little tendency to draw together to close such an enlarged hole. Such a large puncture hole usually requires application of a large covering internal patch which would not pass readily through passageway 24 and removal of the tire from the wheel rim is required.

Under such conditions, the tire repair device of the present invention may be employed in a slightly different manner to facilitate the tire repair. It will be understood that with the tire removed from the wheel rim access is provided to the internal surface of the tire. The hole expanding means 11 may be inserted into the puncture hole from the outside of the tire as before. The plug carrier means without the plug element may be inserted through the hole expander means in a manner similar to that above described so that an open passageway through the wall of the tire is provided by the tube 35.

In this instance, a plug element 14 provided with a greatly enlarged head portion, and with a body portion and elongated tail section as described above, may be positioned in tube 35 by passing the elongated tail section through the inner end of the tube 35 to the outer end of tube 35. The plug element may then be longitudinally stretched and positioned in tube 35 in a manner similar to that described above as by grasping the free tail section outside the tire and pulling the plug element into the tube 35. When the plug element has been thus assembled within the tube, the hole expanding means and plug carrier means may be withdrawn from the hole as described above so as to urge under pressure the back face of the greatly enlarged head portion against internal surfaces of the tire and to position the body portion of the plug element in the puncture hole. It will thus be apparent that the tire repair device of this invention may be employed to apply an enlarged internal patch when access is provided to both sides of a resilient wall.

It will be noted by those skilled in the art that the tire repair device of this invention provides a means and method for repairing a puncture hole in an improved, effective, simple manner. When the plug element is thus installed in a puncture hole, an exceptionally tight seal is effected because the stressed body portion of the plug element acts against the stressed surrounding wall portion of the puncture hole and as a result the surfaces of the body portion and the surfaces in the puncture hole are under resilient pressure contact. In addition, the internal surface margins encircling the inner end of the puncture hole are in pressure contact with the back face of the headed portion of the plug element. Pressure fluid contained in the hollow, resilient member exerts further pressure against the headed portion so that a complete seal is effected.

While it is understood that liquid adhesive and cements have been described above in connection with lubrication of the plug element to facilitate insertion, the prestressed plug element and resilient tire wall will provide an effective seal in the absence of adhesive or cement. To facilitate insertion of the plug element and hole expanding means into the tire wall, other suitable non-adhesive, non-cementing liquids may be employed.

It will be noted that a plug element installed in accordance with this invention cannot be lost either during installation or thereafter and that flexing of the tire wall will not produce any displacement or mislocation of the plug element because it is frictionally gripped by the walls of the puncture hole and restrained against longitudinal movement outwardly of the tire by the headed portion.

In some instances, it may be desirable to form the hole expander means of sufficient strength with a tapered point so that the hole expander may be directly inserted into a puncture hole without preliminary preparation of the hole by the probe member. Under conditions where the hole is large, or relatively large and straight, such a hole expander may be readily employed without damage to the tire wall.

Although the repair device has been described with respect to a tubeless tire, the device may be used on a tire having a tube in order to seal puncture holes in the tire wall to prevent entry of dirt, water, moisture, or other foreign matter which may detrimentally affect a tire tube and its seating against the inner surface of a tire casing wall. In such an instance, the device may be readily used as above described when the tire tube is deflated and collapsed so that the parts of the device will not pierce, tear, or scratch the collapsed tube. The device of this invention is also effectively utilized in repairing puncture holes in so-called "safety tires" which employ a small size inner tube in spaced relation to the tire wall at the tread portion thereof to provide two separate air chambers. In such a safety tire, the inner tube must be removed to place an internal patch on the tire wall. When the inner tube is deflated, a plug element such as 14 may be readily positioned in the tire wall in accordance with the device and with the method of this invention.

It will be understood that the device and method of this invention may be used to repair holes in any wall of relatively resilient material and the reference to a tire wall and tire repair device is not intended to limit the invention to use on tires.

It will be understood by those skilled in the art that various modifications and changes may be made in the repair device and method described above, and all such changes and modifications coming within the scope of the appended claims are embraced thereby.

I claim:

1. A method of repairing a puncture hole in a resilient wall, comprising the steps of: expanding said puncture hole; injecting by movement in one direction a resilient plug element having a portion held under longitudinal tension and in a condition of reduced section into said expanded hole and beyond ultimate position of said plug element, said plug element having a headed portion; and moving said plug element in an opposite direction to cause said headed portion to abut a surface of said wall and to sequentially deposit said tensioned portion in said condition of reduced section in said hole, said tensioned portion after deposit being flowable laterally outwardly to increase said reduced section for providing a tight seal with walls of the puncture hole.

2. A method of repairing a puncture hole in a resilient wall comprising the steps of: temporarily expanding the puncture hole; inserting a resilient plug having a solid stem and a head in back-folded relation to the stem into the expanded hole with the stem being confined under a condition of longitudinal tension and reduced diameter; maintaining said longitudinal tension and reduced diameter in said solid stem while the back-folded head is moved beyond its ultimate position with respect to said puncture hole and also maintaining said confinement and longitudinal tension and reduced diameter in said solid stem while the head is unfolded and retracted until it reaches its ultimate position; applying longituinal tension to reduce the diameter of the solid stem by force applied to that end of the stem adjacent the head of the plug; and then progressively reducing the expansion of the puncture hole beginning at the end adjacent the head of the plug so that the resilient wall which is being repaired progressively engages the stem from one end of the hole to the other.

3. A method of repairing a puncture hole, as stated in claim 2, including the step of simultaneously progressively relieving the temporary expansion of the puncture hole while sequentially depositing adjacent portions of the tensioned and reduced diameter stem in said hole, whereby the material of said stem and said resilient wall flow simultaneously toward each other for providing a tight seal and closure of said puncture hole.

4. In a tire repair device for tubeless tires or the like, the provision of: a rigid solid probe member including a shank intermediate portion having a plurality of spaced annular grooves therein, and a probe tip having a blunt end, said grooves being adapted to be filled with lubricant for depositing said lubricant on walls of a hole in a tire.

5. In a device as stated in claim 4 wherein said probe member is provided with striations on lands defined by said grooves.

6. In a device as stated in claim 4 wherein said probe tip includes external threads of steep pitch.

7. A device as defined in claim 4 wherein said shank of said probe member is provided with lands between said grooves, said shank having an additional tapered annular groove located adjacent the probe tip, said tapered groove being bounded by a substantially conical wall tapering toward said probe tip and by an annular shoulder extending inwardly from the outer periphery to intersect said substantially conical wall.

8. A tire repair device having in combination therewith: a hole-expanding means having a through passageway, a tapered end portion, and a handle portion provided with a shoulder adapted to abut a tire wall for limited insertion of the expanding means in said wall; a probe member slideably received within said through passageway and having a probe portion with an annular recess cooperable with the tapered end portion on the expanding means to releasably maintain the probe member and expanding means in assembly as a unit.

9. A tire repair device as defined in claim 8 in which said probe member is provided with a shoulder adapted to abut the handle portion of the hole-expanding means, with the spacing between the shoulder of the probe member and the annular recess of the probe member being substantially equal to the spacing between the portion of the handle portion of the hole-expanding means which engages the shoulder of the probe member and the tapered end of the hole-expanding means, so that when the probe member is inserted into the hole-expanding means the probe member engages and is secured in position by the handle portion and the tapered end of the hole-expanding means.

10. A repair device for inserting in pucture holes of tires or the like a plug element having a long tail portion of relatively small diameter, a body portion of larger diameter and a flexible backwardly-foldable head portion of still larger diameter, comprising a hole-expanding guide sleeve having a central passageway and having a flared opening and a handle at one end, a solid tubular central portion of approximately uniform diameter, and a tapered blunt open-ended portion at the other end; and a tubular plug carrier of a length sufficient to extend completely through the hole-expanding guide sleeve and having an inner passageway extending from one end to the other for accommodating the tail and body portions of a plug element, the tubular plug carrier having at one end a handle and stop means for engaging the handle end of the hole-expanding guide sleeve when the tubular plug carrier is inserted in the hole-expanding guide sleeve a predetermined distance, the outer diameter of the end of the tubular plug carrier which passes through the tapered end of the hole-expanding guide sleeve being slightly larger than the normal tapered open end of the guide sleeve so that the tapered open end of the guide sleeve is flexed outwardly to grip the plug carrier, the outer diameter of at least the end of the tubular plug carrier which passes through the hole-expanding guide sleeve being less than the inner diameter of the portion of the guide sleeve other than the tapered end portion by an amount sufficient to accommodate the head portion of a plug element in a folded back condition, and the inner passageway at the end of the tubular plug carrier which passes through the hole-expanding guide sleeve being slightly smaller than the body portion of the plug element so that the body portion must be tensioned to reduce its size in order to position it in the plug carrier.

References Cited in the file of this patent

UNITED STATES PATENTS

| | | |
|---|---|---|
| 189,733 | Heffernan | Apr. 17, 1877 |
| 490,369 | Sloper | Jan. 28, 1893 |
| 566,562 | Cox | Aug. 25, 1896 |
| 567,402 | Moomy | Sept. 8, 1896 |
| 594,869 | Griswold | Dec. 7, 1897 |
| 607,379 | Jones | July 12, 1898 |
| 616,572 | Herrick | Dec. 27, 1898 |
| 725,171 | Sutton | Apr. 14, 1903 |
| 1,545,831 | Hirst | July 14, 1925 |
| 1,597,945 | Young | Aug. 31, 1926 |
| 2,293,374 | Wesseler | Aug. 18, 1942 |
| 2,638,961 | Everett | May 19, 1953 |
| 2,727,554 | Westfall | Dec. 20, 1955 |
| 2,804,792 | Westfall | Sept. 3, 1957 |